A. J. KUSTERER & C. SANDERS.
FEEDING AND SEVERING MECHANISM.
APPLICATION FILED NOV. 14, 1914.

1,218,418.

Patented Mar. 6, 1917.
7 SHEETS—SHEET 1.

Witnesses

Inventors
Aloysius Joseph Kusterer
and Charles Sanders
by Mason Fenwick & Lawrence,
Attorneys

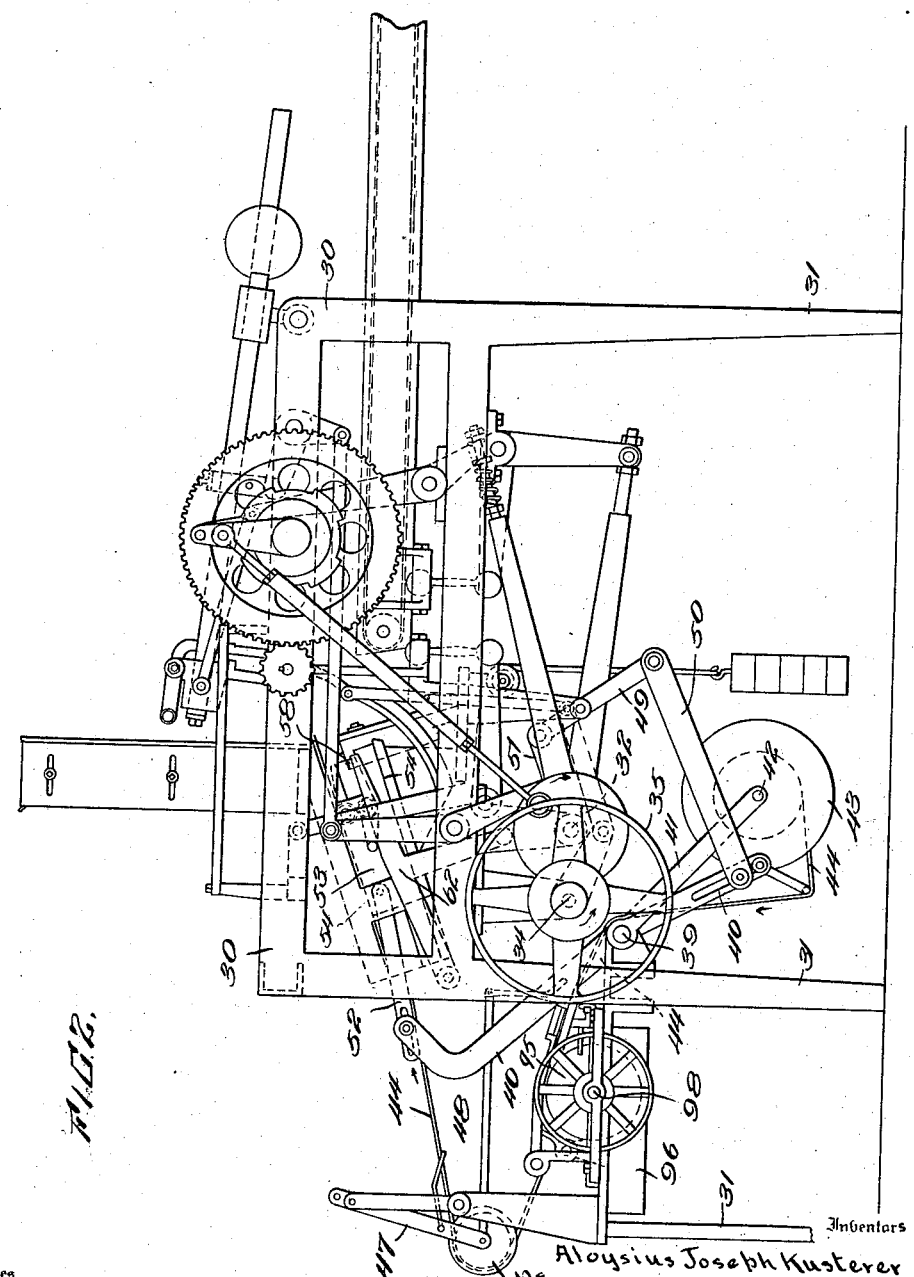

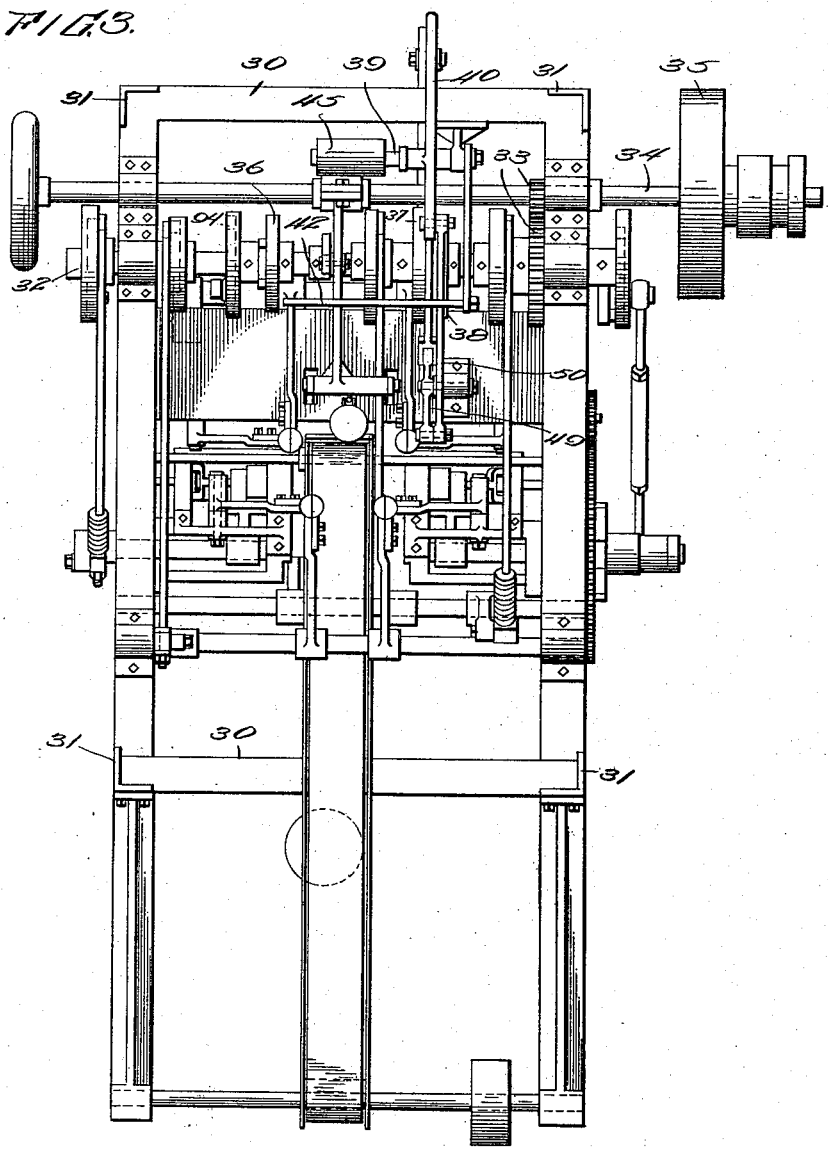

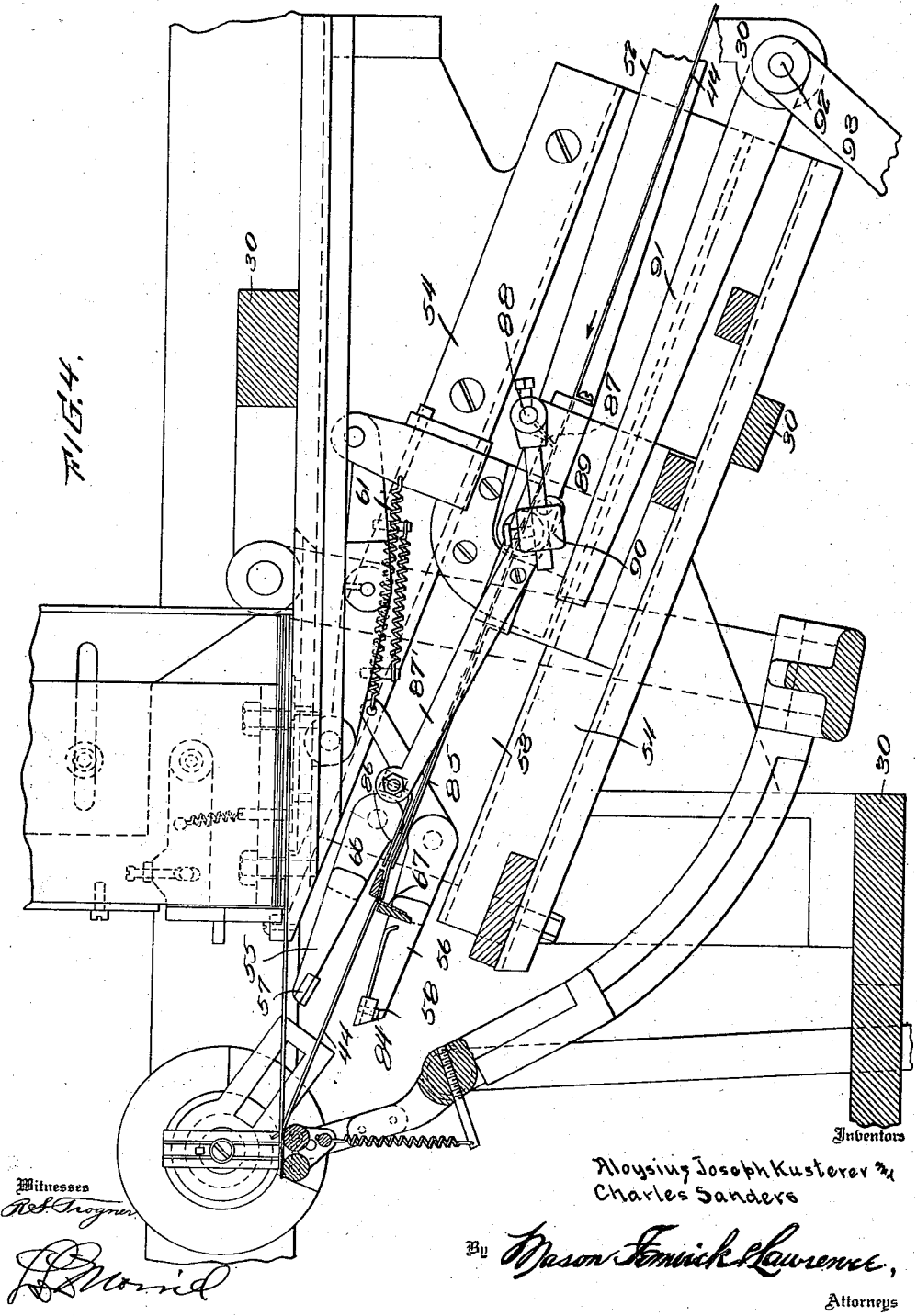

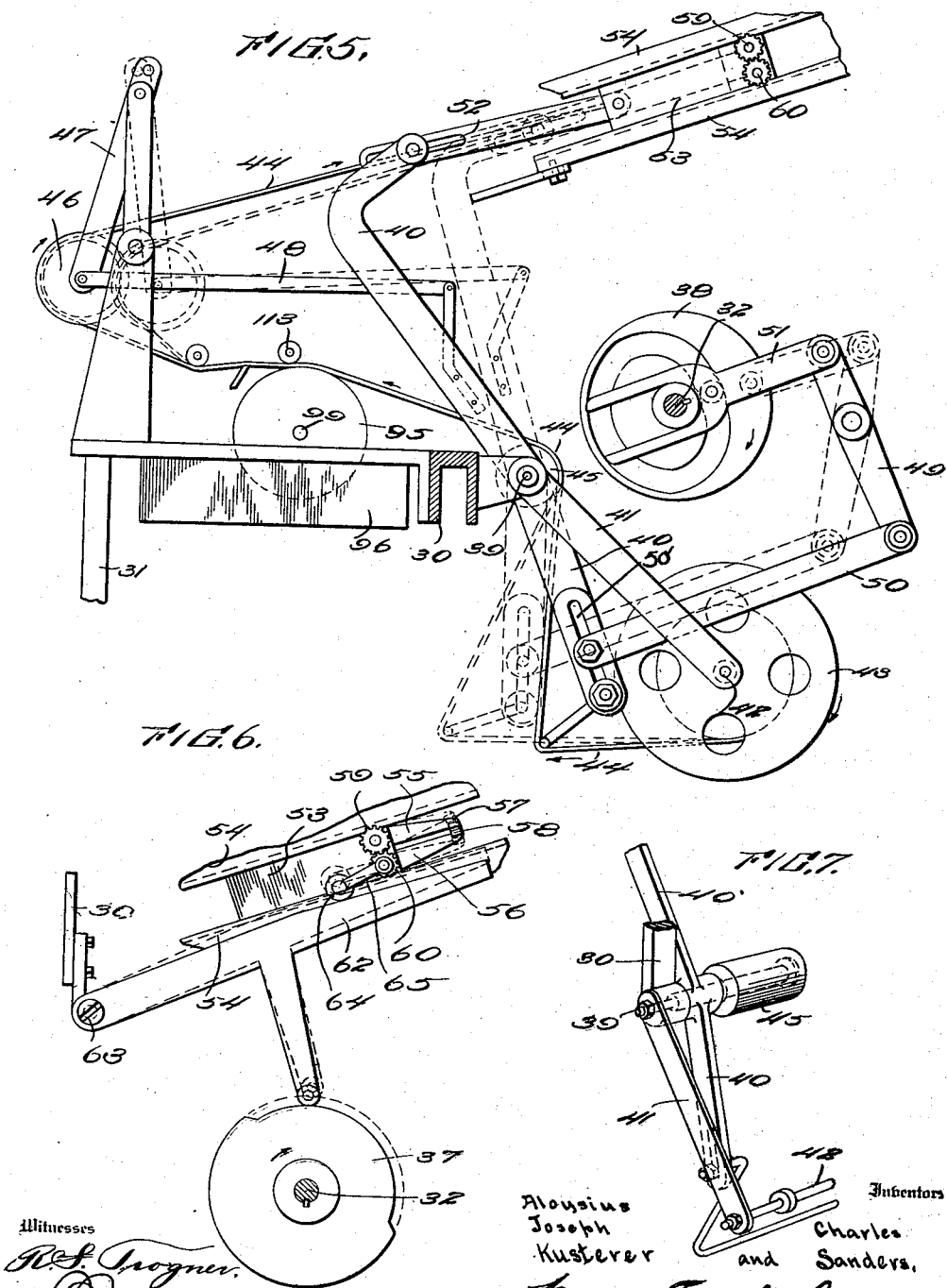

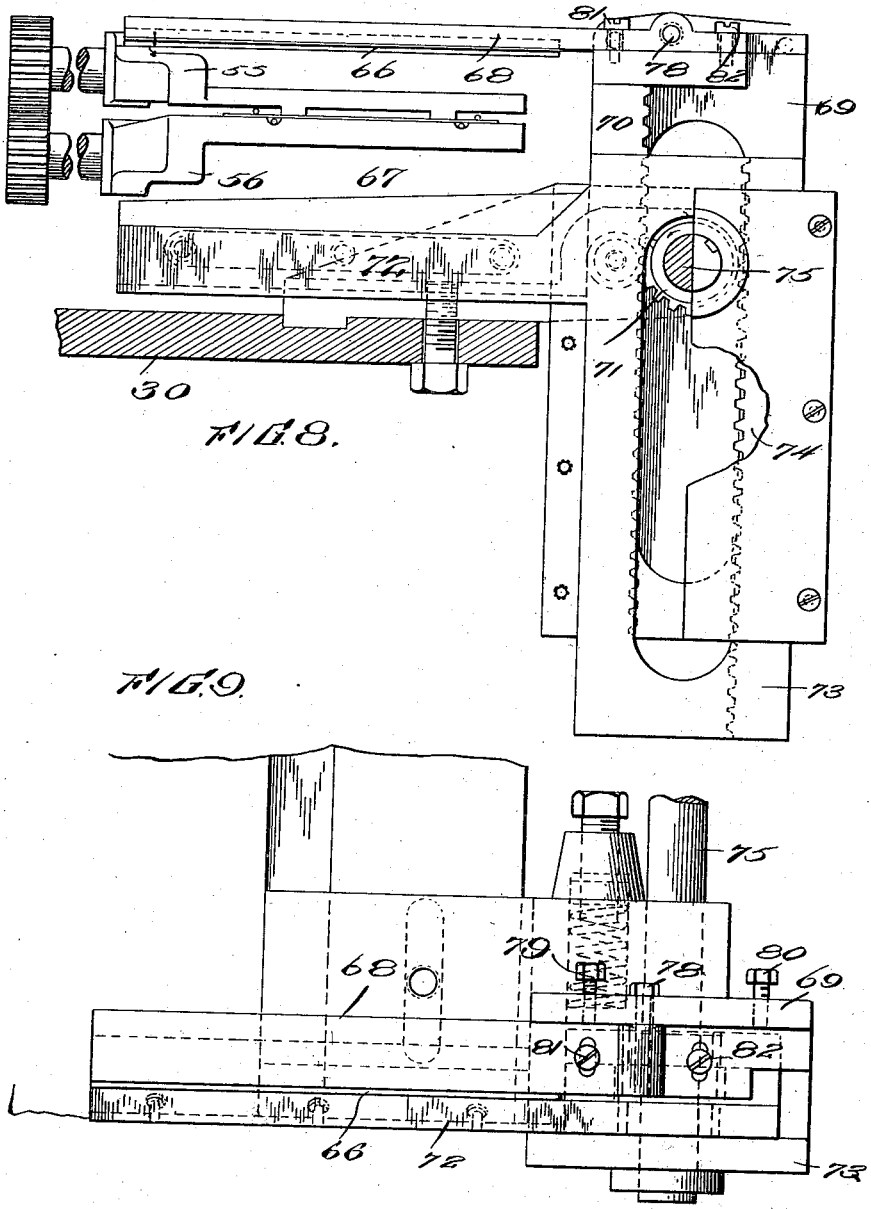

A. J. KUSTERER & C. SANDERS.
FEEDING AND SEVERING MECHANISM.
APPLICATION FILED NOV. 14, 1914.
1,218,418.
Patented Mar. 6, 1917.
7 SHEETS—SHEET 7.
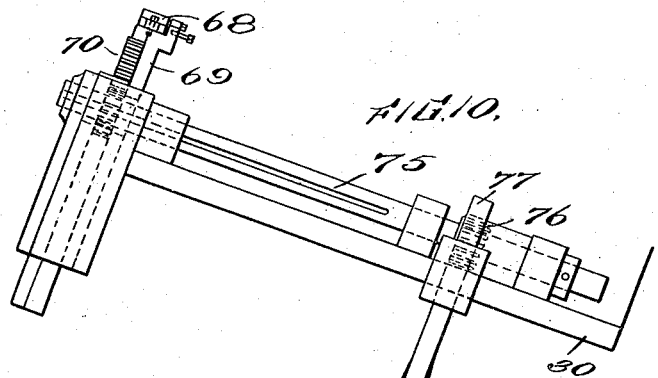
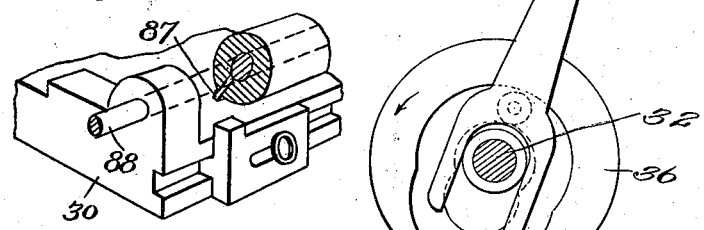
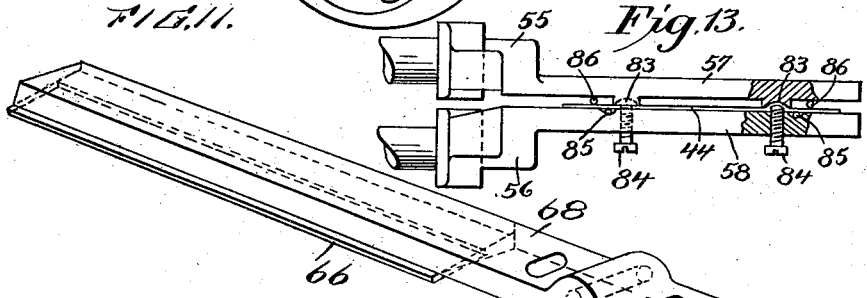
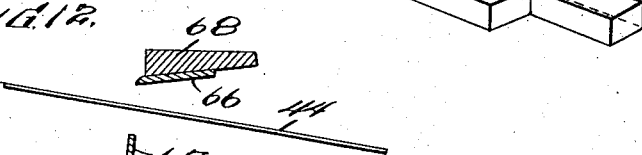
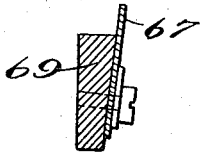
Witnesses
R. J. Trogner
L. L. Norrie
Inventors
Aloysius Joseph Kusterer and
Charles Sanders
By Mason Fenwick Lawrence,
Attorneys

UNITED STATES PATENT OFFICE.

ALOYSIUS JOSEPH KUSTERER, OF RICHMOND, AND CHARLES SANDERS, OF SOUTH RICHMOND, VIRGINIA, ASSIGNORS TO THE RANDOLPH PAPER BOX COMPANY, OF RICHMOND, VIRGINIA, A CORPORATION OF VIRGINIA.

FEEDING AND SEVERING MECHANISM.

1,218,418. Specification of Letters Patent. Patented Mar. 6, 1917.

Original application filed August 15, 1914, Serial No. 856,991. Divided and this application filed November 14, 1914. Serial No. 872,268.

*To all whom it may concern:*

Be it known that we, ALOYSIUS JOSEPH KUSTERER, a citizen of the United States, residing at Richmond, in the county of Henrico and State of Virginia, and CHARLES SANDERS, a citizen of the United States, residing at South Richmond, in the county of Chesterfield and State of Virginia, have invented certain new and useful Improvements in Feeding and Severing Mechanism; and we do hereby declare the following to be a full, clear, and exact description of the invention, such as will enable others skilled in the art to which it appertains to make and use the same.

This invention is a division of application 856,991, filed August 15th, 1914, and relates to feeding and severing mechanism for feeding and severing a sheet, as for instance a sheet of gummed paper to an automatic machine.

An object of the invention is to provide improved feeding and shearing mechanism for feeding a sheet of paper or other material to an automatic machine for producing boxes or other articles, and with improved means for shearing the sheet or web into the necessary or required lengths or sections used in such automatic machine.

With these and other objects in view the invention comprises certain novel constructions, combinations and arrangement of parts as will be hereinafter more fully described and claimed.

In the drawings:

Fig. 2 is a view in side elevation of the machine seen from the side opposite the view of Fig. 1.

Fig. 3 is an inverted plan view of the machine.

Fig. 4 is an enlarged detail view of the paper advancing or feeding mechanism.

Fig. 5 is a detail view of the mechanism for operating the feeding mechanism.

Fig. 6 is a detail view showing the mechanism for opening and closing the jaws of the feeding mechanism.

Fig. 7 is a perspective view of the roll supporting and web guiding mechanism.

Fig. 8 is a view of the shearing mechanism in side elevation showing the jaws of the feeding mechanism located therebetween.

Fig. 9 is a top plan view of the shearing mechanism.

Fig. 10 is a view of the shearing mechanism in end elevation showing the structure for operating the same.

Fig. 11 is a view in perspective of one of the blades of the shearing mechanism.

Fig. 12 is a diagrammatic detail view showing the positions of the jaws of the shearing mechanism with the web extending therebetween.

Fig. 13 is a view of the jaws of the feeding mechanism showing the detail of the strippers.

Fig. 14 is a perspective broken away view of the detent which prevents the return movement of the sheet moved by the feeding mechanism.

Like characters of reference designate corresponding parts throughout the several views.

Figure 1:
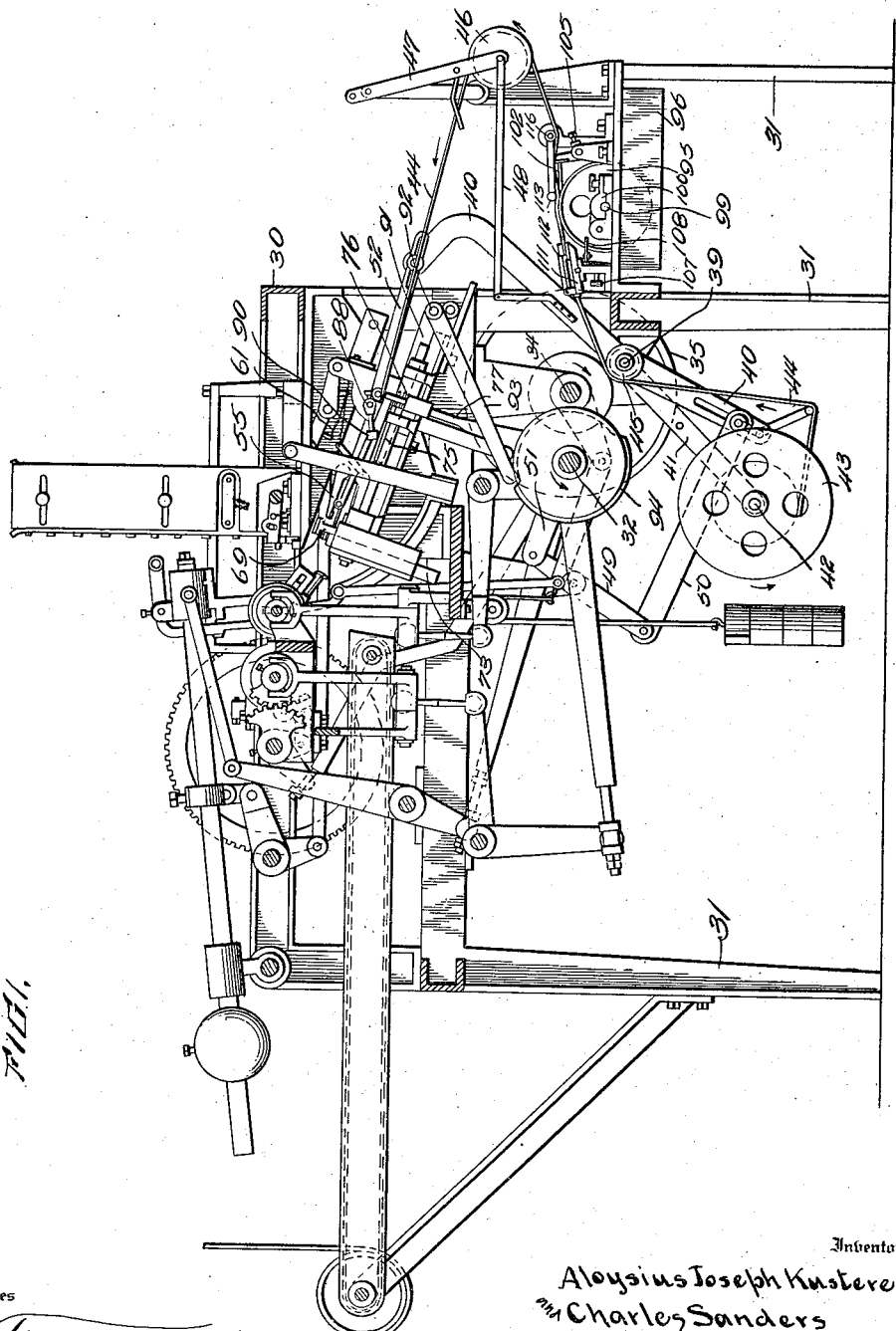
Figure 1 is a view of the improved machine in side elevation, the frame being broken away to show the mechanical structure and shown in conjunction with the box shell forming machine, which forms the subject-matter of the parent application from which this is divided.

The improved feeding and severing mechanism which forms the subject-matter of this divisional application is shown in the parent application as associated with a box shell making machine, but it is to be understood that the utility of the feeding and severing mechanism is not limited to the specific machine to which it is there shown attached, nor to a machine for any specific or special purpose, but is adapted to feed and sever a web of sheet material for any purpose for which such feeding and severing would be desirable. It will, however be described in conjunction with the box shell making machine which forms the subject-matter of the parent application, it being understood that its scope is not thereby limited to such association, or to a utility as forming part of such organized structure.

As shown in the drawings, a frame 30 is employed supported in any approved manner as by the legs 31. Upon this frame 30 a shaft 32 is journaled receiving power in any approved manner, as by the gear 33, seen particularly at Fig. 3 from the shaft 34, which in turn receives power in any approved manner, as by the pulley 35.

Upon the shaft 32 a number of cams are employed, shown at 36, 37 and 38. Journaled also upon the frame 30 is a rock shaft 39 upon which is fulcrumed a lever 40, an arm 41 being rigidly connected therewith and oscillated thereby. The arm 41 is provided with a pin 42, upon which is journaled a spool 43 carrying a web of paper or like material 44.

The paper web 44 passes over a roller 45 journaled upon the shaft 39 and thence over any suitable pasting mechanism. After passing the pasting mechanism, the web passes over a roller 46 journaled upon a pivoted arm 47 which said arm 47 and roller 46 are oscillated by means of a link 48 connected with the lever 40. The lever 40 is itself oscillated from the cam 38 by means of a walking beam 49 carrying a link 50 connected with the lever 40 and a link 51 making proper engagement with the cam 38 as shown more particularly at Fig. 5. At its end opposite the connection with the link 50 the lever 40 is connected with the link 52 which is in turn pivoted to the block 53 slidable in the guides 54, a slot 50' being provided in the lever 40 to vary the throw of such lever. Pivotally connected with the forward end of the block 53 are arms 55 and 56 carrying respectively jaws 57 and 58. The arms 55 and 56 and in consequence the jaws 57 and 58 are constructed to move in unison by employing gears 59 and 60, seen particularly at Figs. 5 and 6, which said gears are concentric with the pivoting of such arms and being intergeared it is obvious that the jaws will move toward and away from each other simultaneously. The jaws and arms are held yieldingly closed by means of a spring 61 and are opened in proper timed relation to the operation of the device by means of the cam 37 carried upon the shaft 32 and a lever 62 pivoted at 63 and engaging under a roller 64 carried by an arm 65 rigidly connected with the pivoting of one of the arms as 56, and all as shown more particularly at Fig. 6. As then the lever 62 is raised by the cam 37 the jaws are opened irrespective of their position relative to the guides 54 and when the lever 62 is lowered the jaws are closed by the spring 61. After passing over the roller 46 the web 44 passes between the jaws 57 and 58, as shown more particularly at Figs. 4 and 5. It is obvious, therefore, that with the opening and closing of the jaws 57 and 58 properly timed they will grasp or clamp the web 44 at the rearward extreme of their limit or at the lower point of movement, as shown at Fig. 4 and continuing to grasp such web will advance to the position shown at Fig. 4, carrying the web therewith. At such point of extreme forward or upward movement the jaws are properly opened by the lever 62 and the web severed by the shear members.

This shearing device comprises an upper shear blade 66, and a lower shear blade 67. The shear blade 66 is carried by an arm 68, which is adjustably connected with the block 69 provided with a rack 70 in engagement with a pinion 71. The shear blade 67 is carried by an arm 72 rigidly connected with a block 73 provided with a rack 74 also engaged by the pinion 71. As the blocks 69 and 73 are mounted slidably relative to each other it is obvious that as the pinion 71 is rotated the blocks and the shears carried thereby will move in opposite directions. To rotate the pinion 71 a shaft 75 is rigidly connected therewith and carries a second pinion 76 engaged by a rack 77 which engages and is operated by the cam 36, as shown more particularly at Fig. 10.

The shears are adjusted for proper cutting by adjusting the shear 66 carried upon the arm 68. The proximity of the arm 68 to the arm 72 is controlled by means of a screw 78 while angular adjustment is accomplished by means of screws 79 and 80 and clamped to position by screws 81 and 82, all of which will be perfectly apparent by an examination of Figs. 8 and 9.

To enable the jaws 57 and 58 to properly grasp a web of paper made slippery by the application of paste thereto one of the jaws, as 57, is provided with lugs 83 having concavities therein as shown more particularly at Fig. 13, while the other jaw, as 58, carries screws 84 having rounded extremities to fit in the concavities as shown in the same figure. To prevent the pasted paper from adhering to the jaws 57 and 58, or to the shears 66 and 67 stripping wires are employed, wires 85 being under the web and attached to the frame as shown at Fig. 4 while the wires 86 are above the web as shown at Figs. 4 and 13, and are carried by arms 87'. The jaw 58 is provided with recesses to receive the wires 85, as shown at Fig. 13, while the wires 86 are accommodated by reason of the jaw 57 having the lugs 83 which form a space between the jaw proper and the web.

To prevent the return of the web 44 after it has been severed by the shear blades 66 and 67 and with the return of the jaws 57 and 58 a detent 87 is employed, shown particularly at Fig. 14. This detent is mounted upon a shaft 88 upon which is also mounted a lever 89 having a weight 90 for holding the detent in grasping engagement with the web 44. It is desirable, of course, that the detent release the paper web upon its forward movement and for this purpose a lever 91 is mounted upon a shaft 92, which carries an arm 93 bearing upon a cam 94 upon the shaft 32. The cam 94 is so arranged that the lever 91 and the detent 87 are lifted at each advance movement of the web 44 and permitted to drop under the action of the weight 90 at each return movement of the jaws 57 and 58.

In operation a spool of paper 43 is placed upon the spindle 42 and the web unwound from the spool, as shown at 44 to pass about the roller 45 and under the detent 87 and between the jaws 57 and 58. The rotation of the shaft 32 then causes the lever 40 to oscillate as hereinbefore described to reciprocate the jaws which are opened and closed in timed relation, as hereinbefore described to grasp the paper web when at the extreme lower limit of their movement and to remain in such grasping position until they reach the upper extreme of the movement passing between the shears 66 and 67 in such upward movement, as shown particularly at Fig. 8. Reaching such upward limit the jaws then are opened in the manner hereinbefore described and pass backwardly, the shear members opening to permit such return. The shear members, it will be noted, are carried upon arms extending from one side of the web of paper while the jaw members are carried upon arms at the other side of the web of paper, so that either may open to permit the passage of the other between. The shears preferably do not act until after the jaws have been opened to release the web and the section of paper thus severed is taken up by any mechanism which is to use the same, the illustration showing a winding mandrel for winding such section of paper about a cardboard blank. It is to be understood, however, as hereinbefore stated, that the winding mechanism or any other mechanism has nothing to do with the present invention, the present invention extending only to the point of advancing the web and severing a section therefrom.

It is obvious also that as the take-up roller 46 oscillates with the arm 40 the unwinding of the web 44 from the spool 43 occurs while the web is being rigidly held by the detent 87 and that when the jaws are advancing to feed the section of paper forwardly the take-up roller 46 also advances thereby permitting the easy movement of the web of paper.

We claim:

1. In a paper working machine, a paper feed embodying gripping jaws; a shear comprising a bearing block; racks mounted within the block; a pinion mounted upon the racks and adapted when rotated to move the racks in opposite directions; and shear members carried by the racks adapted to be separated by the rotation of the pinion to permit the passage of the gripper jaws therethrough and to be closed in the rear of the gripper jaws.

2. In a paper working machine, a shear comprising a bearing block; racks mounted to move in opposite directions within the bearing block; means to simultaneously move the racks in opposite directions; and shear members extending laterally from the racks and retaining throughout their movement their initial parallel relation.

3. In a paper working machine, slidably mounted blocks; means to reciprocate the blocks simultaneously in opposite directions; shear members carried by the blocks and extending laterally therefrom; and means to adjust one of the shear members angularly about the path of reciprocation.

4. In a paper working machine, a reciprocating block; jaws carried by the block and extending laterally therefrom; means to open and close the jaws in timed relation to the reciprocation of the block; lugs carried by one of said blocks and provided in their extremity with concavities; and members carried by the other jaw having rounded extremities registering with and proportioned to fit into the concavities of the lugs.

5. In a paper working machine, vertically slidable blocks, means to simultaneously reciprocate the blocks in opposite directions, shear members carried by the blocks and extended laterally therefrom, a pair of pivoted jaws geared together whereby the same are simultaneously moved in opposite directions, resilient means normally maintaining said jaws closed, cam means for opening the jaws, said jaws being adapted to operate between the shear members.

6. In a paper working machine, a reciprocating block, jaws carried by the block and extending laterally therefrom, a gear carried by each of said jaws, said gears meshing whereby movement imparted to one gear will move the jaws in opposite directions, resilient means for normally maintaining said jaws closed, and cam means actuating the gears for opening said jaws.

7. In a paper working machine, a reciprocating block, jaws pivotally mounted in said block and extended laterally therefrom, a gear carried by each of said jaws, said gears meshing whereby movement imparted to one of the gears will move the jaws in opposite directions, an arm supported by one of said gears, a roller mounted on the terminal of said arm remote from the gear, and cam means contacting with said roller at intervals and in timed relation with the movement of the block for rotating said gears to simultaneously move the jaws in opposite directions.

In testimony whereof, we affix our signatures in the presence of two witnesses.

ALOYSIUS JOSEPH KUSTERER.
CHARLES SANDERS.

Witnesses:
NORMAN VINCENT CAVANAUGH,
PAUL GARLAND SOWERS.

Copies of this patent may be obtained for five cents each, by addressing the "Commissioner of Patents, Washington, D. C."